United States Patent
Weast et al.

(10) Patent No.: US 9,516,381 B2
(45) Date of Patent: Dec. 6, 2016

(54) MEDIA DEVICE POWER MANAGEMENT TECHNIQUES

(71) Applicant: Intel Corporation, Santa Clara, CA (US)

(72) Inventors: John C. Weast, Portland, OR (US); Nicolas C. Galoppo Von Borries, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/569,128

(22) Filed: Dec. 12, 2014

(65) Prior Publication Data

US 2015/0163546 A1    Jun. 11, 2015

Related U.S. Application Data

(63) Continuation of application No. 13/713,881, filed on Dec. 13, 2012, now Pat. No. 8,914,818.

(51) Int. Cl.
*H04N 9/80* (2006.01)
*H04N 21/443* (2011.01)
(Continued)

(52) U.S. Cl.
CPC ............ *H04N 21/4436* (2013.01); *H04N 5/76* (2013.01); *H04N 21/42201* (2013.01);
(Continued)

(58) Field of Classification Search
CPC . H04N 5/79; H04N 21/44222; H04N 21/4436
(Continued)

(56) References Cited

U.S. PATENT DOCUMENTS 8,914,818 B2    12/2014  Weast et al.
2004/0218768 A1    11/2004  Zhurin et al.
(Continued)

OTHER PUBLICATIONS

Non-Final Office Action received for U.S. Appl. No. 13/713,881. Mail Date: Dec. 20, 2013. 10 pages.
(Continued)

*Primary Examiner* — Thai Tran
*Assistant Examiner* — Mishawn Hunter
(74) *Attorney, Agent, or Firm* — Finch & Maloney PLLC (57) ABSTRACT

Techniques and architecture are disclosed for managing power use during operation of an electronic device capable of processing and/or playback of audio and/or video (AV) content. In some instances, the disclosed techniques/architecture can be used, for example: (1) to stop decoding and/or rendering of AV content upon detecting that a user wishes to stop or is otherwise unable to consume (e.g., hear/listen to or otherwise utilize) such AV content; and/or (2) to continue/re-enable decoding and/or rendering of AV content upon detecting that a user wishes or is otherwise able to continue/resume consumption thereof. In some cases, use of the disclosed techniques/architecture may reduce central processing unit (CPU) cycles, audio digital signal processing (DSP), rendering hardware usage, etc., and/or otherwise make more efficient use of battery charge, and thus may realize an improvement in battery life, for example, for a mobile/battery-operated device capable of AV processing and/or playback.

20 Claims, 6 Drawing Sheets

(51) Int. Cl.
   *H04N 5/76*      (2006.01)
   *H04N 21/422*    (2011.01)
   *H04N 21/439*    (2011.01)
   *H04N 21/44*     (2011.01)
   *H04N 5/765*     (2006.01)

(52) U.S. Cl.
   CPC ... *H04N 21/4394* (2013.01); *H04N 21/44008* (2013.01); *H04N 5/765* (2013.01)

(58) Field of Classification Search
   USPC .............. 386/230, 239, 248, 278, 291, 296; 725/9–12, 16, 58, 105; 715/723
   See application file for complete search history.

(56) References Cited

U.S. PATENT DOCUMENTS

| | | |
|---|---|---|
| 2008/0157991 A1 | 7/2008 | Raghunath et al. |
| 2009/0022472 A1* | 1/2009 | Bronstein .......... G06K 9/00751 386/278 |
| 2009/0138507 A1 | 5/2009 | Burckart et al. |
| 2010/0049529 A1 | 2/2010 | Tiption et al. |
| 2011/0150429 A1* | 6/2011 | Kaneko ................. H04N 5/232 386/291 |
| 2011/0196519 A1 | 8/2011 | Khoury et al. |
| 2012/0020641 A1 | 1/2012 | Sakaniwa et al. |
| 2012/0057850 A1 | 3/2012 | Klappert |
| 2012/0137319 A1* | 5/2012 | Schooling ............. H04H 20/40 725/16 |
| 2013/0011114 A1* | 1/2013 | Tashiro ................ G11B 27/105 386/230 |
| 2013/0238341 A1 | 9/2013 | You |
| 2013/0326561 A1 | 12/2013 | Pandey |
| 2014/0169751 A1 | 6/2014 | Weast et al. |

OTHER PUBLICATIONS

Final Office Action received for U.S. Appl. No. 13/713,881. Mail Date: May 23, 2014. 12 pages.

* cited by examiner

MEDIA DEVICE POWER MANAGEMENT TECHNIQUES

RELATED APPLICATION

This application is a continuation of U.S. application Ser. No. 13/713,881 filed Dec. 13, 2012, which is herein incorporated by reference in its entirety.

BACKGROUND

Power management in electronic devices involves a number of non-trivial challenges, and mobile/battery-based electronic devices have faced particular complications at managing power consumption, such as those with respect to audio/video processing and playback.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Techniques and architecture are disclosed for managing power use during operation of an electronic device capable of processing and/or playback of audio and/or video (AV) content. In some instances, the disclosed techniques/architecture can be used, for example: (1) to stop decoding and/or rendering of AV content upon detecting that a user wishes to stop or is otherwise unable to consume (e.g., hear/listen to or otherwise utilize) such AV content; and/or (2) to continue/re-enable decoding and/or rendering of AV content upon detecting that a user wishes or is otherwise able to continue/resume consumption thereof. In some cases, use of the disclosed techniques/architecture may reduce central processing unit (CPU) cycles, audio digital signal processing (DSP), rendering hardware usage, etc., and/or otherwise make more efficient use of battery charge, and thus may realize an improvement in battery life, for example, for a mobile/battery-operated device capable of AV processing and/or playback. Numerous configurations and variations will be apparent in light of this disclosure.

General Overview

As previously indicated, there are a number of non-trivial issues that can complicate power management in mobile/battery-powered electronic devices. For instance, one non-trivial issue pertains to the fact that, in typical electronic devices capable of audio processing and playback, most audio data is software-decoded on the central processing unit (CPU) of the device. Over a sufficiently long period of time, listening to the decoded audio data places a measurable performance tax on the battery, contributing to overall power consumption and depleting the battery life of the device. With existing electronic devices, audio data continues to be decoded and rendered regardless of whether a user is actually listening to it, needlessly wasting CPU cycles and battery life to decode and render audio data/music with no user actively consuming it.

Generally speaking, a number of common/frequent scenarios may present themselves in which a user is not actually listening to the audio output being provided by a given device. For instance, a user may have removed his/her headphones to answer the phone, talk to a colleague, etc., or may have temporarily muted or lowered the volume of the audio because he/she was interrupted with another activity or wanted to hear an announcement (e.g., at the airport, train station, etc.). In some cases, the user may have actively/intentionally stopped consuming audio output, while in some other instances the user may be unable to consume audio output given existing circumstances. While some of these and other example occurrences may be relatively brief, others may be longer in duration, and it is the aggregate of such moments over the lifetime of a battery charge that generally results in real power being needlessly consumed.

Thus, and in accordance with an embodiment of the present invention, techniques and architecture are disclosed for managing power use, for example, during operation of an electronic device capable of processing and/or playback of audio and/or video (AV) content. In some embodiments, the disclosed techniques/architecture can be used to disable decoding and/or rendering of AV content, for example, upon detecting that a user is not actually consuming (e.g., hearing/listening to, viewing, or otherwise utilizing) such AV content. In some instances, decoding and/or rendering may be disabled upon determining that a user: (1) does not wish to consume AV content; and/or (2) is unable to consume AV content. In some embodiments, the disclosed techniques/architecture also can be used, for example, to continue/re-enable decoding and/or rendering of AV content upon detecting that a user: (1) wishes to continue/resume consumption thereof; and/or (2) is able to continue/resume consumption thereof. In accordance with an embodiment, these and other determinations regarding a user's consumption of AV content may be made, at least in part, based on analysis of any of a plurality of audio and/or video (AV) consumption indicators (discussed below).

In some embodiments, an architecture provided as disclosed herein may include, for example: (1) a media player configured to decode and/or render AV content (e.g., audio data files, streaming audio, video data files, streaming video, etc.) and to output an AV signal for downstream use (e.g., by a user/device); and/or (2) an AV activity monitor (AAM) (or other monitoring function/component/device) communicatively coupled with the media player. In some embodiments, one or more sensors and/or devices may be communicatively coupled with the AAM and configured, for example, to sense stimuli/data of potential relevance to any of a wide variety of AV consumption indicators. In accordance with an embodiment, these detected stimuli/data may be analyzed, for example, by the AAM.

Upon analysis of a given AV consumption indicator, the AAM may instruct the media player, in some instances, to continue its current operation (or otherwise may provide no instruction to the media player, which consequently may continue its current operation). In some other instances, the AAM may instruct the media player to adjust the manner in which it obtains (e.g., file downloading, audio/video streaming, cloud streaming, etc.) and/or processes (e.g., decodes, renders, etc.) AV content/data, in accordance with an embodiment. For example, in some cases, the AAM may instruct the media player to start, stop, and/or resume decoding and/or rendering of AV content, in accordance with an embodiment. In some such instances, the AAM further may instruct the media player, in accordance with an embodiment, to start, stop, and/or resume tracking or noting the elapsed time at which decoding and/or rendering of AV content was stopped. Additional and/or different instructions for the media player may be provided by the AAM and will depend on a given target application or end use, as will be apparent in light of this disclosure.

As previously noted, some embodiments of the present invention may reduce power consumption and/or central processing unit (CPU) usage, for example, during AV processing and/or playback in an electronic device. For instance, in some embodiments, power and/or CPU consumption may be reduced at times when AV content is being decoded and/or rendered but is not actually being consumed by a user (e.g., the user has stopped or is unable to hear/listen to or otherwise utilize the AV content). In some embodiments, battery/radio power consumption may be reduced, for example, by halting the download/streaming of AV content/data from a content stream or other source. Furthermore, some embodiments may realize reductions, for instance, in audio digital signal processing (DSP), rendering hardware usage, etc., in some cases.

In some embodiments, the effective battery life for a given electronic device may be extended. For instance, in some specific example embodiments, an improvement in effective battery life in the range of about 30-50% or better (e.g., as compared to an electronic device retained solely in active/ uninhibited playback mode) may be realized. However, it should be noted that the claimed invention is not so limited, and some embodiments may realize greater and/or lesser improvements in effective battery life or otherwise reduce power consumption. For instance, as will be appreciated in light of this disclosure, a purely hardware-based implementation may provide, in some cases, higher power consumption savings as compared with a purely software-based implementation.

As will be appreciated in light of this disclosure, the disclosed techniques and/or architecture can be used, for example, in any of a wide variety of electronic devices capable of AV content/data processing and/or playback. Some such devices may include, but are not necessarily limited to: mobile phones; portable media players (PMPs); tablets; notebook computers (e.g., laptops); subnotebook computers (e.g., ultraportable devices such as an Ultrabook; mini-notebook; etc.); and/or any other mobile/battery-operated electronic device, as will be apparent in light of this disclosure. As will be further appreciated in light of this disclosure, some embodiments of the present invention can be implemented in a given electronic device, for example, in the form of software, hardware, and/or a blend thereof. Numerous suitable configurations will be apparent in light of this disclosure.

As will be appreciated in light of this disclosure, and in accordance with an embodiment, use of the disclosed techniques and/or architecture may be detected, for example, by monitoring a device's media player process and/or by simulating a scenario/cue which would trigger a change in the media player process (e.g., an inaudible audio/video scenario which triggers the AAM, etc.) and observing whether a change in device output occurred during that event. Other suitable approaches to detecting use of one or more of the disclosed techniques and/or architectures will depend on a given application and will be apparent in light of this disclosure.

Architecture and Operation

Figure 1:
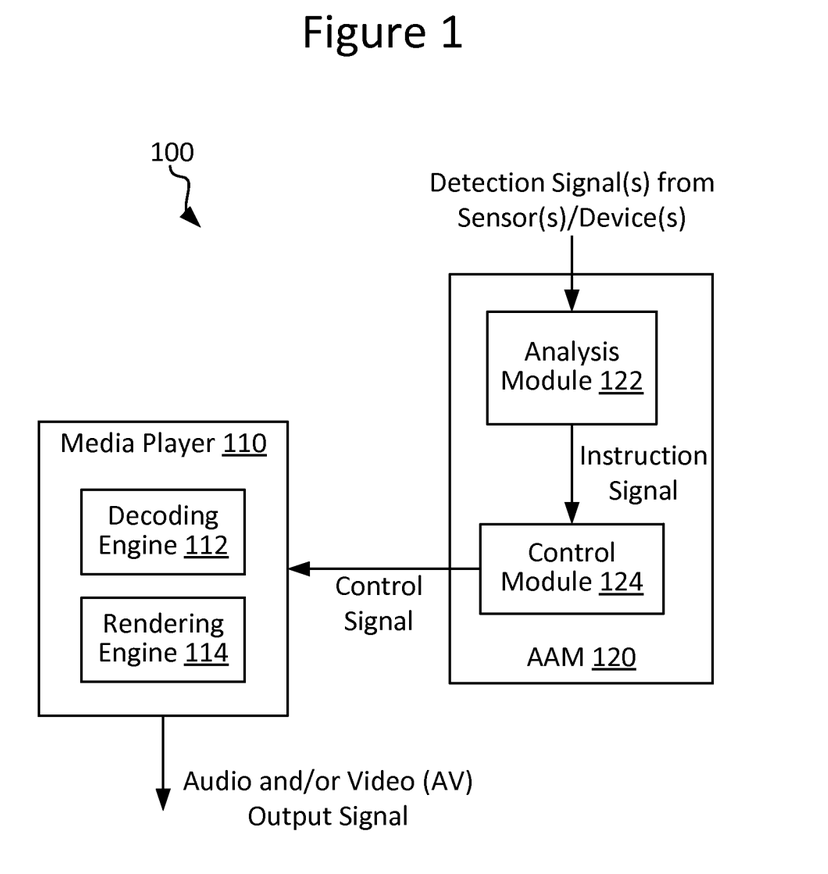
FIG. 1 is a block diagram of an architecture configured in accordance with an embodiment of the present invention.

FIG. 1 is a block diagram of an architecture 100 configured in accordance with an embodiment of the present invention. As can be seen, architecture 100 may include, for example, a media player 110 communicatively coupled with an audio and/or video (AV) activity monitor (AAM) 120 (or other monitoring feature, component, device, etc.). Media player 110 may include, in some embodiments, a decoding engine 112 and/or a rendering engine 114. AAM 120 may include, in some embodiments, an analysis module 122 and/or a control module 124. As will be appreciated in light of this disclosure, media player 110 and/or AAM 120 can be implemented in a given electronic device, in part or in whole, in the form of software, hardware, and/or a blend thereof. As will be further appreciated in light of this disclosure, architecture 100, media player 110, and/or AAM 120 may include additional, fewer, and/or different elements or components from those here described, and the claimed invention is not intended to be limited to any particular architecture configurations, but can be used with numerous configurations in numerous applications.

As will be appreciated in light of this disclosure, decoding engine 112 and/or rendering engine 114 of media player 110 can be generally configured as conventionally done, for instance, to provide media player 110 (and thus a given electronic device implementing media player 110) with AV content processing and/or playback capabilities. However, and in accordance with an embodiment, media player 110 also may be capable of altering its performance, for example, based on instructions received from AAM 120 (discussed below). For instance, in some embodiments, media player 110 may be capable of adjusting the manner in which it obtains (e.g., receives, downloads, intercepts, etc.) AV content/data from a given source of thereof (e.g., audio/ video stream, cloud stream, etc.). For example, in some cases, media player 110 may halt downloading of AV content until instructed to resume downloading (e.g., by AAM 120). In some embodiments, media player 110 may be capable of adjusting the manner in which it processes (e.g., decodes and/or renders) AV content which it has obtained. For example, in some cases, media player 110 may stop processing AV content until instructed to resume processing (e.g., by AAM 120). Thus, in a sense, media player 110 may be considered an audio/video (AV) activity aware media player (AAAMP), in some embodiments. Numerous suitable configurations for media player 110, decoding engine 112, and/or a rendering engine 114 will be apparent in light of this disclosure.

As previously noted, AAM 120 (or other monitoring feature, component, device, etc.) may be communicatively coupled with media player 110, in accordance with an embodiment. In some embodiments, AAM 120 also may be communicatively coupled with one or more sensors and/or devices configured to detect stimuli/data relevant to one or more AV consumption indicators (discussed below). In some cases, detection may be performed, in part or in whole, automatically (e.g., without direction/instruction from a user or other external source), while in some other cases, detection may be performed, in part or in whole, upon direction/instruction from an external source (e.g., a user, another electronic device, etc.). In some instances, the detection capabilities of a given sensor/device may be: (1) always on; and/or (2) on demand.

In some cases, a given sensor/device may be embedded or otherwise associated with AAM 120 (e.g., analysis module 122 or other component thereof). However, the claimed invention is not so limited, as in some other cases, a given sensor/device may be external, in part or in whole, to one or more of analysis module 122, AAM 120, architecture 100, and/or a device which implements architecture 100. For instance, in some cases, a given sensor/device may be embedded in or otherwise associated with a decoding device and/or a listening device (e.g., headphones). Numerous suitable configurations will be apparent in light of this disclosure.

Upon detecting/sensing stimuli or other data that may be relevant to a given AV consumption indicator, a given sensor/device may output a signal including data/information pertaining to the one or more AV consumption indicators for downstream use (e.g., analysis/interpretation by analysis module 122, discussed below). Some example AV consumption indicators are discussed below; however, as will be appreciated in light of this disclosure, the examples discussed are not intended to constitute a complete or otherwise comprehensive listing, and other AV consumption indicators will depend on a given application and will be apparent in light of this disclosure. In some cases in which no stimuli/data relevant to a given AV consumption indicator have been detected/sensed, a given sensor/device may be configured to provide an output signal including data/information to that effect (or to provide no output signal).

AAM 120 may be configured, in some embodiments, to receive a given sensor/device output signal, for example, at analysis module 122. Analysis module 122 may be configured, in accordance with an embodiment, to analyze or otherwise interpret such signal and to determine for which AV consumption indicator(s), if any, the stimuli/data are relevant. Also, in accordance with an embodiment, analysis module 122 may be configured to send an instruction signal to control module 124 (discussed below) if it determines that one is warranted upon analysis of the stimuli/data relevant to a given AV consumption indicator (e.g., if a given AV consumption indicator indicates that a user is likely not consuming the decoded and/or rendered AV content provided by media player 110). In accordance with an embodiment, interpretation/analysis may be performed, in part or in whole, for example, by logic, software, and/or programming embedded or otherwise associated with analysis module 122. Other techniques/approaches for providing analysis module 122 with the ability to analyze or otherwise interpret a given AV consumption indicator and/or data relevant thereto will depend on a given application and will be apparent in light of this disclosure.

In some cases, the instruction signal of analysis module 122 may include instructions for the control module 124, for example: (1) to output a control signal instructing media player 110 to stop obtaining (e.g., downloading) and/or processing (e.g., decoding and/or rendering) AV content/data; (2) to output a control signal instructing media player 110 to continue/resume obtaining and/or processing AV content/data; and/or (3) to output no control signal. Additional and/or different instructions for the instruction signal of analysis module 122 will depend on a given application and will be apparent in light of this disclosure.

In accordance with an embodiment, control module 124 may be configured to output a control signal for downstream use, such as by a media player 110 communicatively coupled therewith. In accordance with an embodiment, such control signal may instruct media player 110 to operate or otherwise perform in a certain manner. For example, in some cases, the control signal may include instructions to the media player 110: (1) to stop decoding and/or rendering of AV content and to track or note the elapsed time at which the stoppage occurred; (2) to stop tracking or noting the elapsed/stoppage time (e.g., clear a tracked or noted elapsed/stoppage time) and to resume decoding and/or rendering of AV content at that time point; and/or (3) to continue decoding and/or rendering of AV content. In some instances, the control signal may include instructions to the media player 110: (1) to stop obtaining (e.g., downloading, streaming, etc.) AV content/data from a given content source and to note the byte location, server location, etc., at which the stoppage occurred; (2) to resume obtaining AV content from the content source where it left off; and/or (3) to continue obtaining AV content/data from the content source. Thus, as previously noted, and in accordance with an embodiment, media player 110 may adjust the manner in which it obtains (e.g., downloads, streams, etc.) and/or processes (e.g., decodes and/or renders) AV content for outputting an AV output signal for consumption/use by a user (or other device). Other suitable configurations for control module 124 will depend on a given application and will be apparent in light of this disclosure.

Example Audio and/or Video (AV) Consumption Indicators and Detection Thereof

As previously noted, a given sensor/device may be configured to output a signal including data relevant to one or more AV consumption indicators. As will be appreciated in light of this disclosure, the term "audio and/or video (AV) consumption indicator" generally may refer to a measurement, cue, event, factor, circumstance, condition, and/or other index/indices which signifies or otherwise suggests that a user is or is not currently consuming (e.g., hearing/listening to, viewing, or otherwise utilizing) decoded and/or rendered AV content; (2) does or does not wish to resume consuming decoded and/or rendered AV content which is currently stopped; and/or (3) is able or unable to consume decoded and/or rendered AV content. Some AV consumption indicators described herein may relate to operation (e.g., physical, electronic, intentional, unintentional, etc.) of a switch or a function, for instance, that does not otherwise inherently pause or stop the AV content decoding and/or rendering process of media player 110, as will be apparent in light of this disclosure. Some AV consumption indicators described herein may relate to an action/event, for instance, during which or as a result of which it may be desirable to pause or stop the AV content decoding and/or rendering process of media player 110, as will be apparent in light of this disclosure. More generally, any of a wide variety of AV consumption indicators may be utilized with the disclosed techniques/architecture, in accordance with an embodiment.

It should be noted that while several example AV consumption indicators are discussed herein in the context of one or more of the various embodiments of the present invention, such examples are not intended to be interpreted as a complete or otherwise comprehensive listing. Additional and/or different AV consumption indicators will depend on a given application and will be apparent in light of this disclosure.

Also, in some cases, there may be a hierarchy or other ordering (inherent and/or user-determined), for example: (1) for determining whether one AV consumption indicator is to be analyzed before or otherwise in preference over another AV consumption indicator; and/or (2) for determining whether one AV consumption indicator is of greater significance than (e.g., supersedes or otherwise overrides) another AV consumption indicator. However, the claimed invention is not so limited, as in some other cases, no hierarchy or other ordering may be imposed/implemented on a given plurality of AV consumption indicators.

Furthermore, as will be appreciated in light of this disclosure, and in accordance with an embodiment, detection/analysis of any given AV consumption indicator may be toggled on or off by the user, as desired. In some embodiments, architecture 100 may be configured or otherwise include programming, for example, to learn over time from user preferences and/or experiences to better serve the user's needs/desires. In short, numerous configurations will be apparent in light of this disclosure.

In accordance with an embodiment, one example AV consumption indicator may involve determining whether a mute function/switch is engaged. As will be appreciated in light of this disclosure, a given mute function/switch may be associated with one or more of media player 110, an electronic device implementing architecture 100, a speaker system/headphones communicatively coupled with an electronic device implementing architecture 100, etc. Detection of whether a mute function/switch has been enabled or disabled may be performed, for example, as conventionally done. Suitable circuitry and/or software configured to monitor the state of a given mute function/switch will depend on a given application and will be apparent in light of this disclosure.

In accordance with an embodiment, if a mute function/switch is disabled, then that may signify that a user is currently consuming decoded and/or rendered AV content. Conversely, if a mute function/switch is enabled, then that may signify that a user is not currently consuming decoded and/or rendered AV content. If a mute function/switch changes its state from being enabled to disabled, then that may signify that a user wishes or is otherwise able to resume consuming decoded and/or rendered AV content.

In accordance with an embodiment, another example AV consumption indicator may involve determining whether a playback volume level has changed. As will be appreciated in light of this disclosure, a given volume level adjustment feature may be associated with one or more of media player 110, an electronic device implementing architecture 100, a speaker system/headphones communicatively coupled with an electronic device implementing architecture 100, etc. Detection of whether a volume level has been adjusted and/or maintained may be performed, for example, as conventionally done. Suitable circuitry and/or software configured to monitor the state of a given volume changing function/switch will depend on a given application and will be apparent in light of this disclosure.

In accordance with an embodiment, if a playback volume level has not been lowered to zero or near zero, then that may signify that a user is currently consuming decoded and/or rendered AV content. Conversely, if a playback volume level has been lowered to zero or near zero, then that may signify that a user is not currently consuming decoded and/or rendered AV content. If a volume level is increased from zero or near zero to a higher value, then that may signify that a user wishes or is otherwise able to resume consuming decoded and/or rendered AV content. If a volume level is increased from an initial non-zero value (or a value which is not near zero) to a higher value, then that may signify that a user wishes to continue consuming decoded and/or rendered AV content.

In accordance with an embodiment, another example AV consumption indicator may involve determining whether at least one headphone speaker is engaged with a user's ear; that is, whether a speaker is placed on the ear, over the ear, in the ear, against the ear, near the ear, etc. As will be appreciated in light of this disclosure, removal of both headphone speakers from a user's ears may occur intentionally (e.g., user actively removes the headphones from his/her ears) and/or accidentally (e.g., the headphones may be pulled off or fall from a user's ears, etc.).

In accordance with an embodiment, detection of headphone speaker engagement may be performed by any of a wide variety of techniques/apparatus. For instance, in some example embodiments, a given headphone speaker may include a light sensor configured to detect light levels, whereby relative darkness may indicate that a speaker is engaged with a user's ear and relative brightness may indicate that a speaker is not engaged with a user's ear. In some other example embodiments, a given headphone speaker may include a thermal sensor configured to detect the temperature of its surroundings, whereby relatively warmer temperatures may signify that a speaker is engaged with a user's ear and relatively cooler temperatures may signify that a speaker is not engaged with a user's ear. In some still other example embodiments, a given headphone speaker may include a gyroscopic sensor or accelerometer configured to detect movement/acceleration thereof, whereby an acceleration/movement of sufficient magnitude in a given direction may signify that a speaker has been disengaged, re-engaged, etc.

In some yet other example embodiments, a given headphone speaker may include a pressure sensor configured to detect a physical pressure and/or a sound pressure, whereby presence of a physical pressure (e.g., speaker cup against the head/ear; in-ear monitor in the ear canal; etc.) and/or a sound pressure (e.g., local pressure deviation/fluctuation produced by a sound wave, for instance, at least partially reflected back towards the speaker) may signify that a speaker is engaged with a user's ear. In some other example embodiments, a given headphone speaker may include a distance/range finding sensor configured to detect proximity of a physical object, whereby a sufficiently proximate physical object (e.g., the user's ear, head, etc.) may signify that a speaker is engaged with a user's ear. Other suitable detection techniques/apparatus will depend on a given application and will be apparent in light of this disclosure.

In accordance with an embodiment, if at least one headphone speaker is engaged with a user's ear, then that may signify that a user is currently consuming decoded and/or rendered AV content. Conversely, if no headphone speaker is engaged with a user's ear (e.g., the headphones have been removed, intentionally or otherwise), then that may signify that a user is not currently consuming decoded and/or rendered AV content. If initially no headphone speaker is engaged with either of a user's ears, but subsequently at least one headphone speaker is engaged with a user's ear, then that may signify that a user wishes or is otherwise able to resume consuming decoded and/or rendered AV content.

In accordance with an embodiment, another example AV consumption indicator may involve determining whether a user is talking aloud (e.g., with a bystander, on the phone, etc.). In accordance with an embodiment, detection of a user's commencement/cessation of talking may be performed, for example, by a microphone or other audio input device. As will be appreciated in light of this disclosure, it may be desirable to provide the microphone/device (or else, architecture 100) with the ability to differentiate, for example, between a user's talking and his/her singing, humming, etc. In some cases, differentiation may be aided, for example, by features/functions such as, but not limited to: (1) voice identification; (2) detection of multiple (e.g., two or more) voices; (3) word recognition; and/or (4) tonal recognition. Other suitable detection techniques/apparatus will depend on a given application and will be apparent in light of this disclosure.

If a user is not talking aloud, then that may signify that a user is currently consuming decoded and/or rendered AV content. If a user is talking aloud, then that may signify that a user is not currently consuming decoded and/or rendered AV content. If a user initially was talking aloud, but subsequently ceased talking aloud (e.g., for a given period of time, which may be preset by the user or other standards), then that may signify that the user wishes or is otherwise able to resume consuming decoded and/or rendered AV content.

In accordance with an embodiment, another example AV consumption indicator may involve determining whether an ambient sound may interfere with a user's ability to consume the decoded and/or rendered AV content and/or may be sufficiently important for a user to hear the ambient sound in preference over the decoded and/or rendered AV content. To that end, and in accordance with an embodiment, a determination may be made as to whether such an ambient sound is sufficiently loud (e.g., the intensity of the sound crosses a threshold level, which may be preset by the user or other standards) and/or sufficiently protracted (e.g., the duration of the sound crosses a threshold period of time, which may be preset by the user or other standards). Some examples of ambient sounds may include, but are not necessarily limited to, a car horn, a siren, a child crying, an alarm, a doorbell, a phone ringing, a thunderclap, an explosion, an announcement over a loudspeaker system, etc. In accordance with an embodiment, detection of the intensity level of an ambient sound may be performed, for example, by a microphone or other suitable audio input device, as will be apparent in light of this disclosure. Also, in accordance with an embodiment, detection of the duration of an ambient sound may be performed, for example, by any suitable time measurement device, as will be apparent in light of this disclosure.

If no ambient sound of sufficient loudness or sufficient duration is detected, then that may signify that a user is currently consuming decoded and/or rendered AV content. If an ambient sound of sufficiently high loudness and/or sufficiently long duration is detected, and the playback volume has not been increased subsequently (e.g., within a given time window after the ambient sound occurs), then that may signify that a user is not currently consuming decoded and/or rendered AV content. If an ambient sound of sufficiently high intensity and/or sufficiently long duration is detected, but the playback volume is increased subsequently (e.g., within a given time window after the ambient sound occurs), then that may signify that a user wishes or is otherwise able to continue consuming decoded and/or rendered AV content.

As previously noted, numerous possible AV consumption indicators may be utilized with the disclosed techniques/architecture, in accordance with an embodiment, and the claimed invention is not intended to be limited to any of the various example AV consumption indicators described herein. For instance, in some cases, provision may be made for identifying biometric/physiological cues which may signify changes in a user's consumption of decoded and/or rendered AV content (e.g., breathing rate, snoring, heart rate, body temperature, etc.). In some cases, provision may be made for identifying visual cues which may signify changes in a user's consumption of decoded and/or rendered AV content (e.g., motion tracking, eye tracking, etc.). In some instances, provision may be made for communication with an external device (e.g., phone, doorbell, alarm, computing device, smart device, etc.) to identify situations in which a user's consumption of decoded and/or rendered AV content may have changed. Suitable techniques/apparatus for detection of these and other example AV consumption indicators will depend on a given application and will be apparent in light of this disclosure.

Methodology

Figure 2:
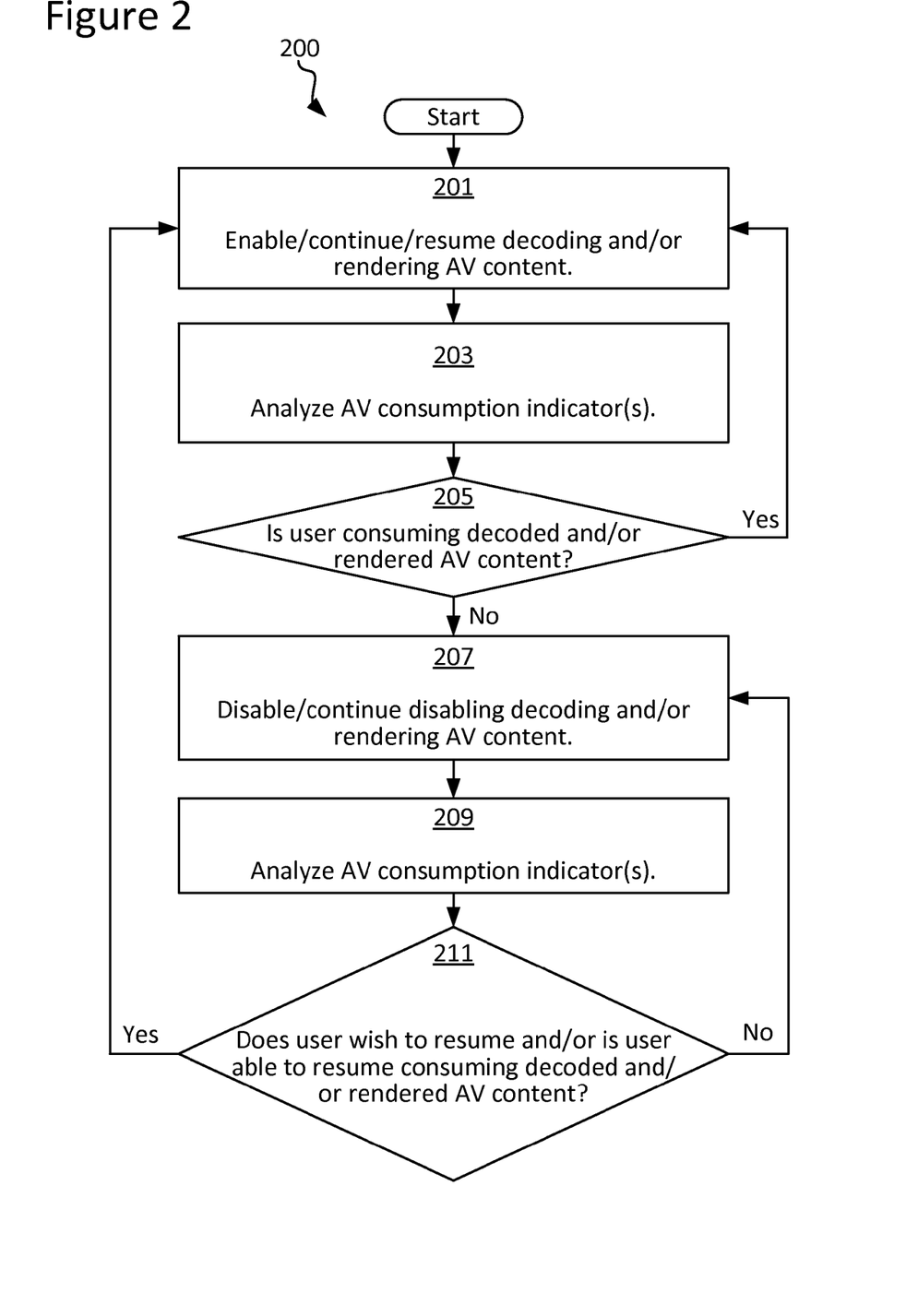
FIG. 2 is a flow diagram illustrating an example method of operating an electronic device with audio and/or video (AV) processing and/or playback capabilities, in accordance with an embodiment of the present invention.

FIG. 2 is a flow diagram illustrating an example method of operating an electronic device with audio and/or video (AV) processing and/or playback capabilities, in accordance with an embodiment of the present invention. As can be seen, the process may begin, as in block 201, with enabling decoding and/or rendering AV content (e.g., audio data, video data, etc.). In some cases, the decoding and/or rendering of AV content may be performed, for example, by media player 110 (discussed above). The process may continue, as in block 203, with analyzing one or more AV consumption indicators. As discussed above, stimuli/data relevant to a given AV consumption indicator may be sensed or otherwise detected by a given sensor/device communicatively coupled with AV activity monitor (AAM) 120 (discussed above). AAM 120 may be configured to analyze the one or more AV consumption indicators and, in some instances, to instruct media player 110 to alter its operation/performance based on its analysis.

Figure 3A:
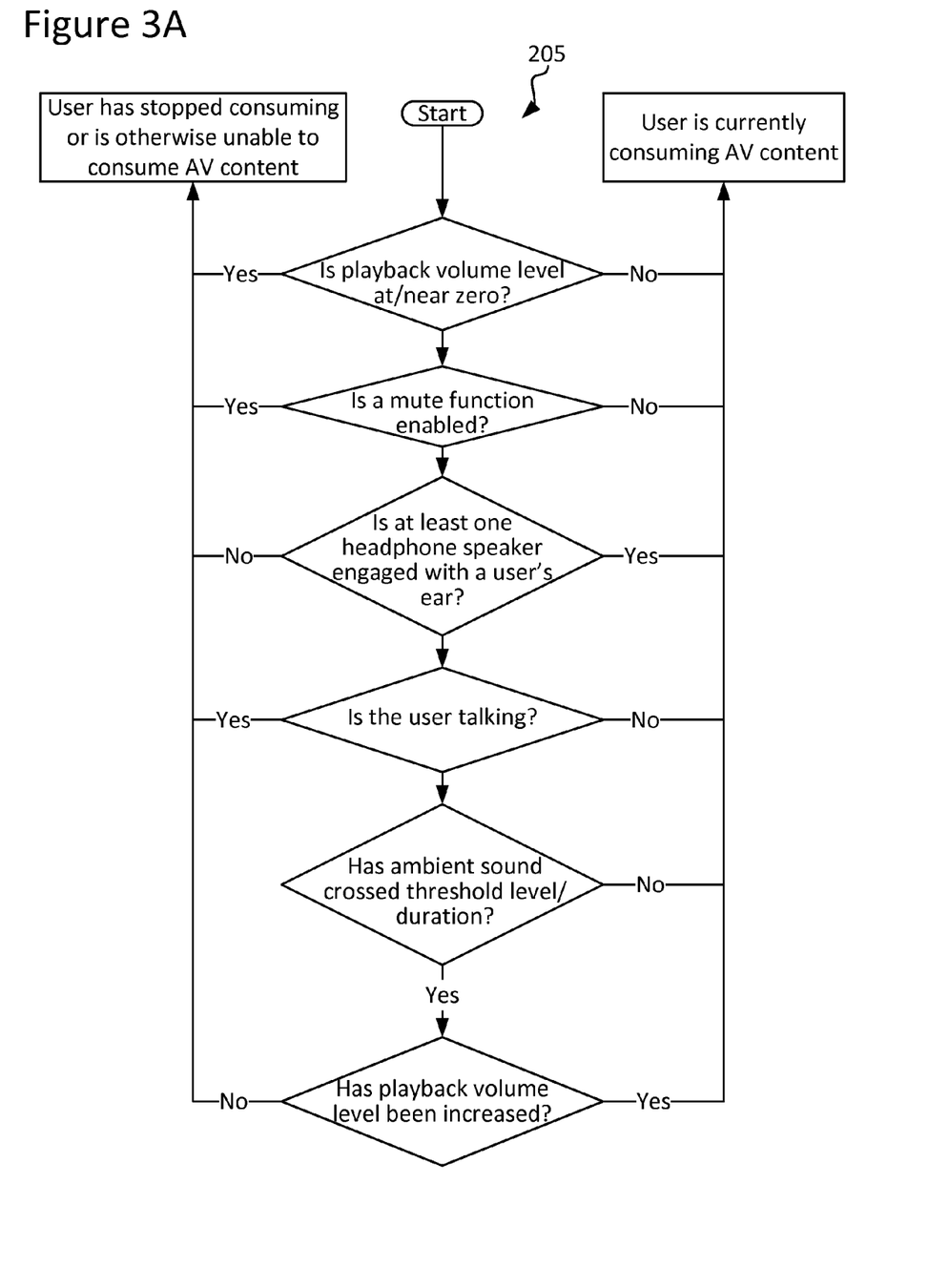
FIG. 3A is a decision tree diagram illustrating some example AV consumption indicators which may be analyzed in the process flow of FIG. 2, in accordance with an embodiment of the present invention.

The process flow may continue, as in block 205, with determining whether a user is consuming the decoded and/or rendered AV content based on the analysis of the one or more AV consumption indicators. FIG. 3A is a decision tree diagram illustrating some example AV consumption indicators which may be analyzed in the process flow of FIG. 2, in accordance with an embodiment of the present invention. As previously noted, the example AV consumption indicators discussed, for instance, here in the context of FIG. 3A are not intended to be an exhaustive or otherwise comprehensive or complete listing. Additional and/or different AV consumption indicators which may be considered in the process flow depicted in FIG. 2 will depend on a given application or end use and will be apparent in light of this disclosure.

If any or all of the AV consumption indicators indicate that the user is consuming the AV content, then decoding and/or rendering thereof (e.g., by media player 110) may continue, as in block 201, and analysis of one or more AV consumption indicators (e.g., by AAM 120) may continue, as in block 203. If instead a given AV consumption indicator indicates that the user is not actually consuming the AV content (e.g., has stopped consuming and/or is otherwise unable to continue consuming AV content), then the process flow may continue, as in block 207, with disabling decoding and/or rendering of the AV content. That is, in some cases, media player 110 may be instructed by AAM 120 to stop decoding and/or rendering the AV content data until further notice and to track or otherwise note the elapsed/stoppage time.

The process flow may continue, as in block 209, with analyzing one or more AV consumption indicators. Again, as discussed above, stimuli/data relevant to a given AV consumption indicator may be sensed or otherwise detected by a given sensor/device communicatively coupled with AAM 120, and AAM 120 may be configured to analyze the one or more AV consumption indicators and, in some instances, to instruct the media player 110 to alter its operation/performance.

Figure 3B:
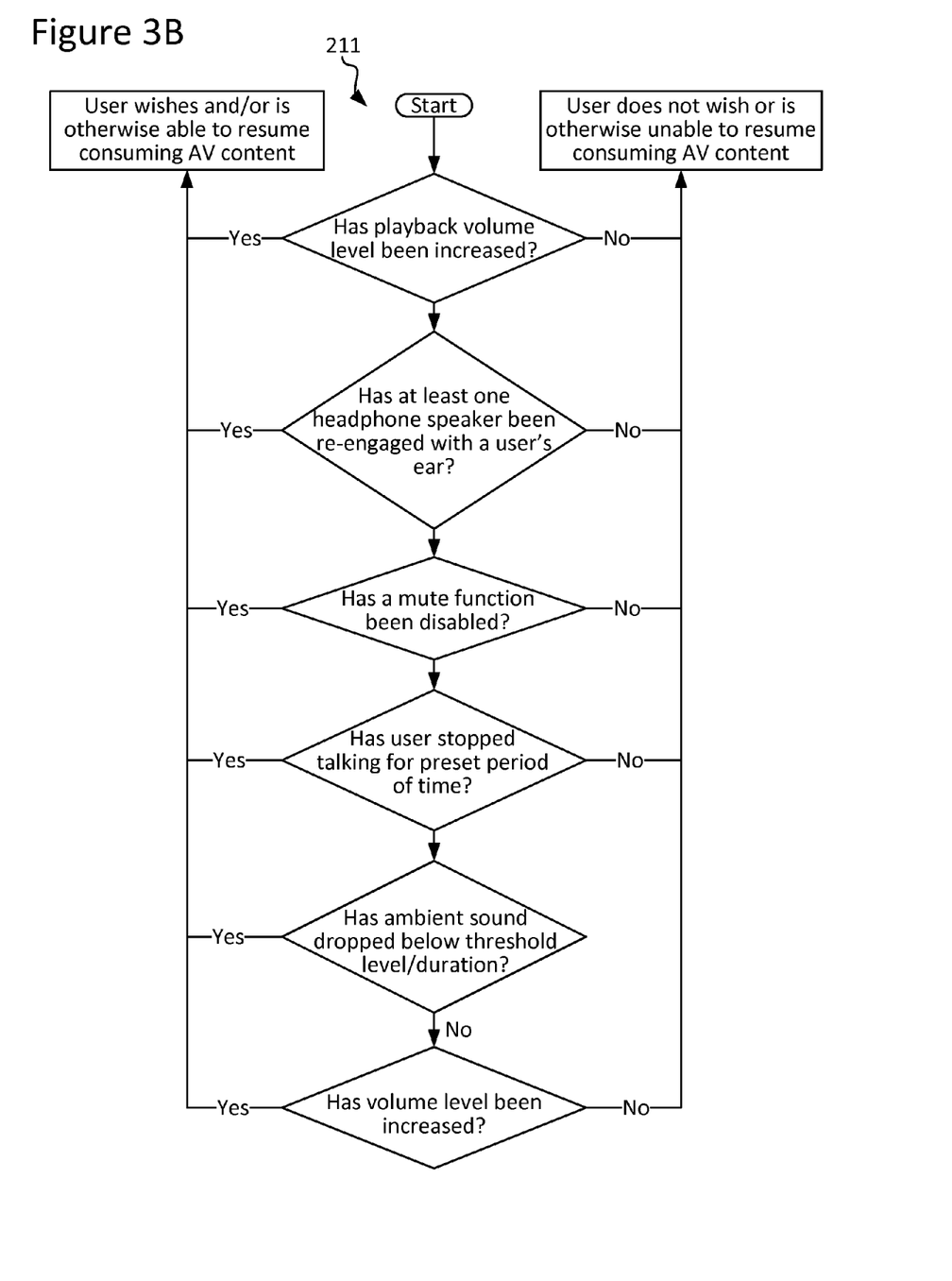
FIG. 3B is a decision tree diagram illustrating some example AV consumption indicators which may be analyzed in the process flow of FIG. 2, in accordance with an embodiment of the present invention.

The process flow may continue, as in block 211, with determining whether a user wishes and/or is otherwise able to resume consuming the decoded and/or rendered AV content based on analysis of the one or more AV consumption indicators. FIG. 3B is a decision tree diagram illustrating some example AV consumption indicators which may be analyzed in the process flow of FIG. 2, in accordance with an embodiment of the present invention. As previously noted, the example AV consumption indicators discussed, for instance, here in the context of FIG. 3B are not intended to be an exhaustive or otherwise comprehensive or complete listing. Additional and/or different AV consumption indicators which may be considered in the process flow depicted in FIG. 2 will depend on a given application or end use and will be apparent in light of this disclosure.

If any or all of the AV consumption indicators indicates that the user wishes and/or is otherwise able to resume consuming the AV content, then decoding and/or rendering thereof (e.g., by media player 110) may resume (e.g., when so instructed by AAM 120), as in block 201, for instance, at the elapsed/stoppage time previously tracked/noted. If instead any or all of the AV consumption indicators indicates that the user does not wish or is otherwise unable to resume consuming the AV content, then the process flow may continue, as in block 207, with disabling decoding and/or rendering of the AV content. That is, in some cases, media player 110 may be instructed by AAM 120 to continue to disable decoding and/or rendering the AV content until further notice and to continue to track or otherwise note the elapsed/stoppage time.

Numerous variations on this process will be apparent in light of this disclosure. As will be appreciated, and in accordance with an embodiment, each of the functional boxes (e.g., 201, 203, 207, and 209) and decision points (e.g., 205 and 211) shown in FIG. 2 can be implemented, for example, as a module or sub-module that, when executed by one or more processors or otherwise operated, causes the associated functionality as described herein to be carried out. The modules/sub-modules may be implemented, for instance, in software (e.g., executable instructions stored on one or more computer readable media), firmware (e.g., embedded routines of a microcontroller or other device which may have I/O capacity for soliciting input from a user and providing responses to user requests), and/or hardware (e.g., gate level logic, field programmable gate array, purpose-built silicon, etc.).

Example System

Figure 4:
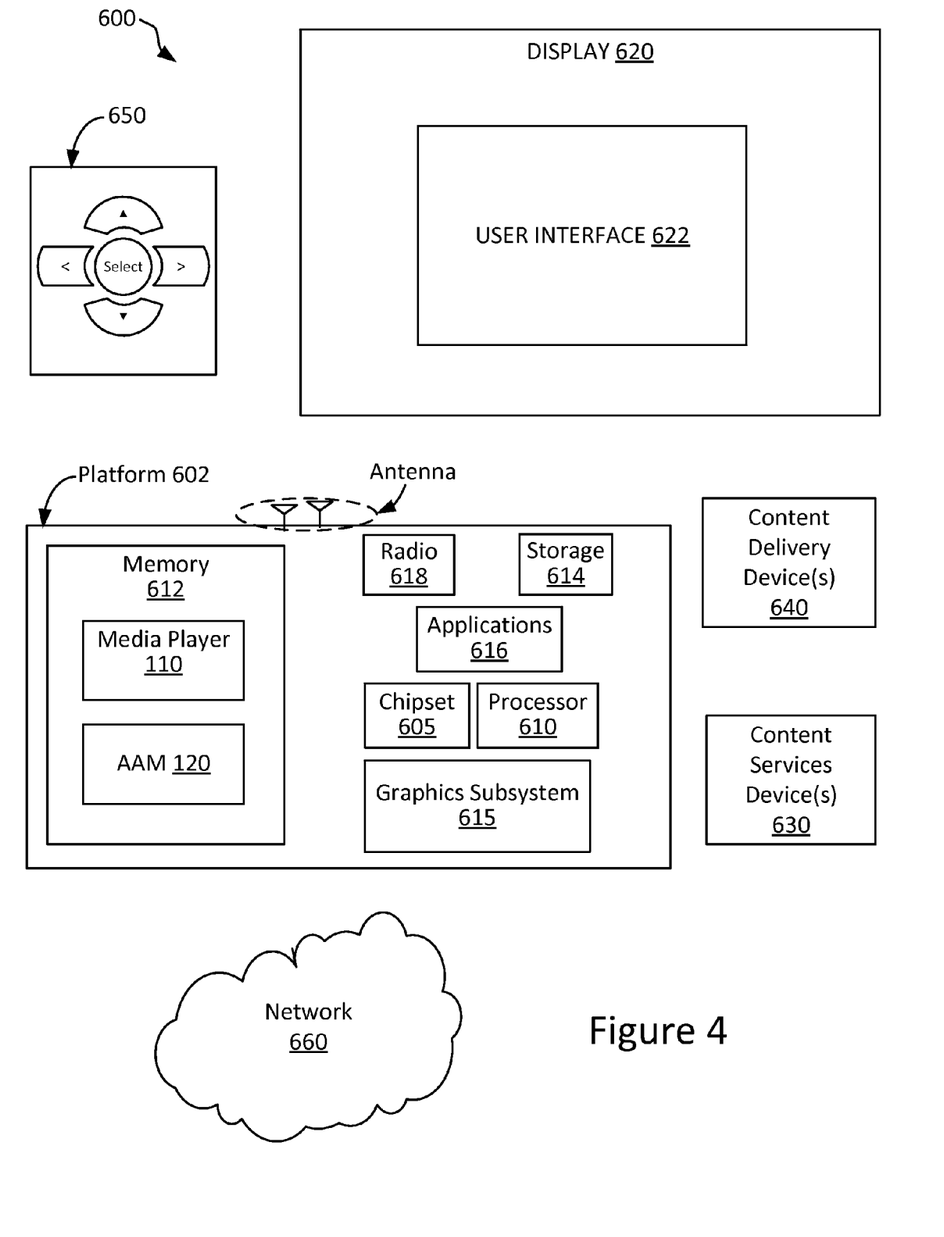
FIG. 4 illustrates an example system that may utilize the power management techniques/architecture as described herein, in accordance with some embodiments.

FIG. 4 illustrates an example system 600 that may utilize the power management techniques/architecture as described herein, in accordance with some embodiments. In some embodiments, system 600 may be a media system, although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact, for example, with platform 602 and/or display 620. Each of these example components is described in more detail below.

In some embodiments, platform 602 may comprise any combination of a chipset 605, processor 610, memory 612, storage 614, graphics subsystem 615, applications 616, and/or radio 618. Chipset 605 may provide intercommunication among processor 610, memory 612, storage 614, graphics subsystem 615, applications 616, and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Also, memory 612 may be implemented, in some embodiments, with one or more of media player 110 and/or AV activity monitor (AAM) 120. Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface (HDMI), DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The power management techniques/architecture described herein may be implemented in various hardware architectures. For example, the power management techniques/architecture as provided herein may be integrated within a graphics and/or video chipset. Alternatively, a discrete security processor may be used. In still another embodiment, the graphics and/or video functions including the power management techniques/architecture may be implemented by a general purpose processor, including a multi-core processor.

Radio 618 may include one or more radios capable of transmitting and receiving signals using various suitable wireless communications techniques. Such techniques may involve communications across one or more wireless networks. Exemplary wireless networks may include, but are not limited to, wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, display 620 may comprise any television or computer-type monitor or display. Display 620 may comprise, for example, a liquid crystal display (LCD) screen, electrophoretic display (EPD) or liquid paper display, flat panel display, touch screen display, television-like device, and/or a television. Display 620 may be digital and/or analog. In some embodiments, display 620 may be a holographic or three-dimensional display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display a user interface 622 on display 620.

In some embodiments, content services device(s) 630 may be hosted by any national, international, and/or independent service and thus may be accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer (PC), network, telephone, Internet-enabled devices or appliance capable of delivering digital information and/or content, and any other similar device capable of unidirectionally or bi-directionally communicating content between content providers and platform 602 and/or display 620, via network 660 or directly. It will be appreciated that the content may be communicated unidirectionally and/or bi-directionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the claimed invention. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI) and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 716, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chip set 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the claimed invention.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions, or control words meant for an automated system. For example, control information may be used to route media information through a system or instruct a node to process the media information in a predetermined manner (e.g., using the power management techniques/architecture as described herein). The embodiments, however, are not limited to the elements or context shown or described in FIG. 4.

Figure 5:
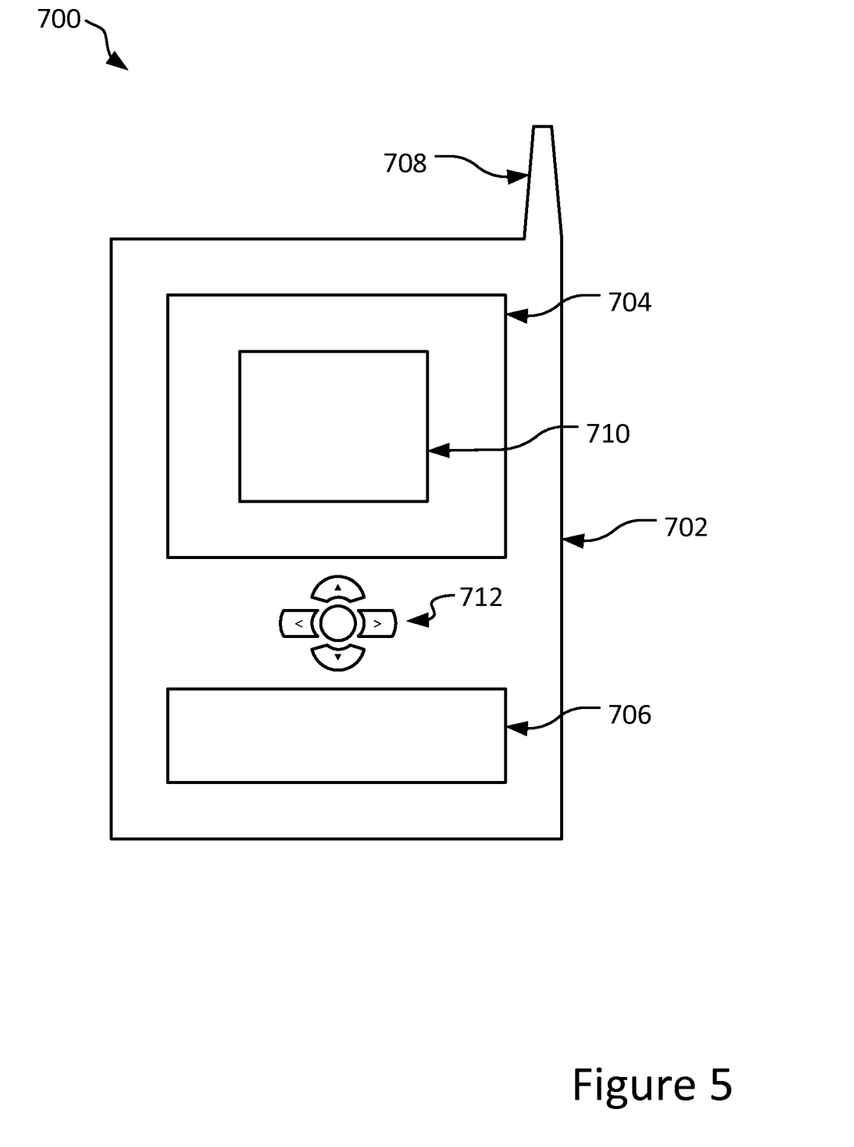
FIG. 5 illustrates embodiments of a small form factor device in which the system of FIG. 4 may be embodied.

As described above, system 600 may be embodied in varying physical styles or form factors. FIG. 5 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 5, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits (IC), application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds, and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present invention. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled, and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers, or other such information storage, transmission, or displays. The embodiments are not limited in this context.

Numerous embodiments will be apparent in light of this disclosure. One example embodiment of the present invention provides a system for use with a media player configured to playback audio and/or video (AV) content, wherein playback includes at least one of decoding and/or rendering the AV content. The system includes a sensor configured to detect a stimulus relevant to an AV consumption indicator and to output a first signal including data about the stimulus, an analysis module configured to receive the first signal and to determine if a user of the media player is actually consuming the AV content based on the first signal, and a control module configured to output a control signal to the media player, the control signal for stopping or starting playback of the AV content based on output from the analysis module. In some cases, the AV consumption indicator comprises at least one of a measurement, cue, event, factor, circumstance, condition, and/or index which indicates whether the user is actually consuming the AV content. In some instances, the sensor comprises at least one of an audio sensor, a light sensor, a thermal sensor, a gyroscope, an accelerometer, a pressure sensor, and/or a range-finding sensor. In some cases, the output from the analysis module includes an instruction for the control module to either output the control signal or to output no signal. In some instances, the system further includes the media player. In some cases, the control signal includes an instruction for the media player to at least one of continue decoding and/or rendering AV content, stop decoding and/or rendering AV content, and/or resume decoding and/or rendering AV content. In some instances, the control signal includes an instruction for the media player to at least one of start tracking an elapsed time at which decoding and/or rendering of the AV content was stopped and/or stop tracking the elapsed time at which decoding and/or rendering of the AV content was stopped. In some cases, the control signal includes an instruction for the media player to at least one of continue downloading AV content, stop downloading AV content, and/or resume downloading AV content. In some cases, the control signal includes an instruction for the media player to at least one of continue streaming AV content, stop streaming AV content, and/or resume streaming AV content. In some instances, the control signal includes an instruction for the media player to at least one of start tracking a byte location at which decoding and/or rendering of the AV content was stopped and/or stop tracking the byte location at which decoding and/or rendering of the AV content was stopped. In some cases, the AV content comprises audio only. In some example cases, the system is part of a portable computing device. In some such cases, the portable computing device comprises at least one of a mobile phone, a portable media player, a tablet, a laptop computer, a notebook computer, and/or a subnotebook computer. In some cases, the system further includes at least one of a speaker configured to engage an ear of a user and/or a display.

Another example embodiment of the present invention provides a computer-readable medium encoded with instructions that, when executed by one or more processors, causes a process for operating an electronic device with audio and/or video (AV) processing and/or playback capabilities to be carried out, the process including enabling decoding and/or rendering of AV content, analyzing one or more AV consumption indicators, and determining, based on analysis of the one or more AV consumption indicators, whether a user is actually consuming decoded and/or rendered AV content. In some cases, if the user is actually consuming decoded and/or rendered AV content, the process further includes continuing decoding and/or rendering the AV content. In some instances, if the user is not actually consuming decoded and/or rendered AV content, the process further includes stopping decoding and/or rendering of AV content. In some such cases, the process further includes tracking an elapsed time at which decoding and/or rendering of AV content was stopped. In some such instances, the process further includes analyzing one or more AV consumption indicators and determining, based on analysis of the one or more AV consumption indicators, whether the user at least one of wishes to resume consuming decoded and/or rendered AV content and/or is able to resume consuming decoded and/or rendered AV content. In some such cases, if the user at least one of wishes to resume consuming the decoded and/or rendered AV content and/or is able to resume consuming decoded and/or rendered AV content, the process further includes resuming decoding and/or rendering of AV content at the elapsed time.

Another example embodiment of the present invention provides an electronic device including a media player configured to decode and/or render audio and/or video (AV) content and a monitor communicatively coupled with the media player. The monitor is configured to analyze an AV consumption indicator to determine whether a user is actually consuming decoded and/or rendered AV content and output a control signal to the media player based on analysis of the AV consumption indicator, wherein the control signal causes the media player to adjust its decoding and/or rendering of AV content.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system, comprising:
    a sensor configured to detect a stimulus relevant to an AV consumption indicator and to output a first signal including data about the stimulus;
    an analysis module configured to determine if a user of a media player is actually consuming AV content based on the first signal, and in response to signaling of multiple AV consumption indicators, to impose an order on those AV consumption indicators, the order determining at least one of whether one of the AV consumption indicators is to be analyzed in preference over another of the AV consumption indicators and whether one of the AV consumption indicators is of greater significance than another of the AV consumption indicators; and
    a control module configured to output a control signal to the media player, the control signal for stopping or starting playback of the AV content based on output from the analysis module.

2. The system of claim 1, wherein each AV consumption indicator comprises at least one of a measurement, cue, event, factor, circumstance, condition, and index which indicates whether the user is actually consuming the AV content.

3. The system of claim 1, wherein the sensor comprises at least one of an audio sensor, a light sensor, a thermal sensor, a gyroscope, an accelerometer, a pressure sensor, and a range-finding sensor.

4. The system of claim 1, wherein the output from the analysis module includes an instruction for the control module to either output the control signal or to output no signal.

5. The system of claim 1 further comprising a media player configured to playback at least one of audio and video (AV) content, wherein playback includes at least one of decoding and rendering the AV content.

6. The system of claim 1, wherein the control signal includes an instruction for a media player to at least one of:
    continue decoding AV content;
    continue rendering AV content;
    stop decoding AV content;
    stop rendering AV content;
    resume decoding AV content; and
    resume rendering AV content.

7. The system of claim 1, wherein the control signal includes an instruction for a media player to at least one of:
start tracking an elapsed time at which at least one of decoding and rendering of the AV content was stopped; and
stop tracking the elapsed time at which at least one of decoding and rendering of the AV content was stopped.

8. The system of claim 1, wherein the control signal includes an instruction for a media player to at least one of:
continue downloading AV content;
stop downloading AV content; and
resume downloading AV content.

9. The system of claim 1, wherein the control signal includes an instruction for a media player to at least one of:
continue streaming AV content;
stop streaming AV content; and
resume streaming AV content.

10. The system of claim 1, wherein the control signal includes an instruction for a media player to at least one of:
start tracking a byte location at which at least one of decoding and rendering of the AV content was stopped; and
stop tracking the byte location at which at least one of decoding and rendering of the AV content was stopped.

11. The system of claim 1, wherein the AV content comprises audio only.

12. The system of claim 1, wherein the system is part of a portable computing device, and the portable computing device comprises at least one of a mobile phone, a portable media player, a tablet, a laptop computer, a notebook computer, and a subnotebook computer.

13. The system of claim 12 further comprising at least one of a display and a speaker configured to engage an ear of a user.

14. The system of claim 1, wherein at least one of the AV consumption indicators is selected from the group consisting of operation of a mute function, adjustment of a playback volume level, determination of whether the user is talking aloud, determination of whether an ambient sound crosses a threshold intensity level, determination of whether an ambient sound crosses a threshold duration, identification of a biometric/physiological cue pertaining to the user, identification of a visual cue pertaining to the user, and communication with an external device.

15. The system of claim 1, wherein the analysis module imposes an order on the AV consumption indicators that is based at least in part on a context in which at least one of the AV consumption indicators is received, the context determined from the data about the stimulus.

16. The system of claim 1, wherein at least one AV consumption indicator comprises at least one of a measurement, cue, event, factor, circumstance, condition, and index that can be used to form an inference as to whether the user is actually consuming the AV content.

17. A non-transitory computer-readable medium encoded with instructions that, when executed by one or more processors, causes a process for controlling digital content playback capabilities to be carried out, the process comprising:
determining if a user of a media player is actually consuming digital content based on one or more digital content consumption indicators detected by one or more sensors; and
in response to signaling of multiple digital content consumption indicators, imposing an order on those consumption indicators, the order determining at least one of whether one of the consumption indicators is to be analyzed in preference over another of the consumption indicators and whether one of the consumption indicators is of greater significance than another of the consumption indicators.

18. The computer-readable medium of claim 17, the process further comprising at least one of:
in response to determining that the user is not actually consuming the digital content, stopping playback of the digital content; and
in response to determining that the user is actually consuming the digital content, resuming playback of the digital content.

19. A system, comprising:
a sensor configured to detect a stimulus relevant to a digital content consumption indicator and to output a first signal including data about the stimulus;
an analysis module configured to determine if a user of a media player is actually consuming digital content based on the first signal, and in response to signaling of multiple digital content consumption indicators, to determine at least one of whether one of the consumption indicators is to be analyzed in preference over another of the consumption indicators and whether one of the consumption indicators is of greater significance than another of the consumption indicators; and
a control module configured to output a control signal to the media player, the control signal for stopping or starting playback of the digital content based on output from the analysis module.

20. The system of claim 19, wherein the analysis module imposes an order on the digital content consumption indicators that is based at least in part on a context in which at least one of the digital content consumption indicators is received, the context determined from the data about the stimulus.

* * * * *